US008340292B1

(12) United States Patent
Schnellbacher et al.

(10) Patent No.: US 8,340,292 B1
(45) Date of Patent: Dec. 25, 2012

(54) LAWFUL INTERCEPT MANAGEMENT BY AN AUTHORIZATION SYSTEM

(75) Inventors: George Jason Schnellbacher, Overland Park, KS (US); Joao Carlos Osorio Gouvea Teixeira de Magalhaes, Shawnee, KS (US); Joseph C. Shojayi, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 454 days.

(21) Appl. No.: 12/752,574

(22) Filed: Apr. 1, 2010

(51) Int. Cl.
*H04K 1/00* (2006.01)
*G06F 7/04* (2006.01)

(52) U.S. Cl. .......................................... 380/250; 726/4

(58) Field of Classification Search ................ 726/4, 10; 713/156, 168; 380/247, 250, 277; 370/230, 370/252; 455/410, 415, 456.1
See application file for complete search history.

(56) References Cited

U.S. PATENT DOCUMENTS

| | | | |
|---|---|---|---|
| 6,466,571 B1 | 10/2002 | Dynarski et al. | |
| 6,711,689 B2 | 3/2004 | Lumme et al. | |
| 6,978,128 B1 | 12/2005 | Raman et al. | |
| 6,999,435 B2 | 2/2006 | Perras | |
| 7,130,625 B2 | 10/2006 | Akgun et al. | |
| 7,295,545 B2 | 11/2007 | Ray et al. | |
| 7,397,763 B2 | 7/2008 | Bradd | |
| 7,533,160 B2 | 5/2009 | Hsu | |
| 7,577,422 B2* | 8/2009 | Laiho et al. .................. | 455/410 |
| 7,649,881 B2 | 1/2010 | Casey | |
| 7,730,521 B1* | 6/2010 | Thesayi et al. .................. | 726/4 |
| 7,934,094 B2* | 4/2011 | Oyama ........................ | 713/168 |
| 8,031,672 B2* | 10/2011 | Balaji et al. .................. | 370/331 |
| 8,073,446 B2* | 12/2011 | Ishii et al. ..................... | 455/436 |
| 8,130,725 B2* | 3/2012 | Chen ............................. | 370/331 |
| 2004/0157629 A1* | 8/2004 | Kallio et al. .................. | 455/466 |
| 2004/0202295 A1 | 10/2004 | Shen et al. | |
| 2005/0063544 A1* | 3/2005 | Uusitalo et al. .................. | 380/277 |
| 2005/0094651 A1* | 5/2005 | Lutz et al. ..................... | 370/401 |
| 2006/0146792 A1 | 7/2006 | Ramachandran et al. | |
| 2007/0050613 A1 | 3/2007 | Islam et al. | |
| 2007/0088670 A1 | 4/2007 | Laurila | |
| 2007/0121812 A1* | 5/2007 | Strange et al. .................. | 379/70 |
| 2007/0179796 A1* | 8/2007 | Taglienti et al. .................. | 705/1 |
| 2007/0286202 A1 | 12/2007 | Dos Remedios et al. | |
| 2007/0297376 A1 | 12/2007 | Gass | |

(Continued)

OTHER PUBLICATIONS

Cisco Systems Inc., "Radius Attribute—Value Pairs," Cisco Documentation, Sep. 24, 1999, 20 pages, Cisco Systems Inc., http://www.cisco.com/univercd/cc/td/doc/product/access/acs_soft/csacs4nt/csnt24/csnt24ug/ap_rads.htm.

(Continued)

*Primary Examiner* — Nathan Flynn
*Assistant Examiner* — Abdullah Almamun

(57) ABSTRACT

An authorization system in a home wireless network comprises a communication interface and a processing system, wherein a wireless communication device associated with the home wireless network transfers a request to a visited wireless network for access to an internet. The communication interface is configured to receive an authorization request for the wireless communication device transmitted from the visited wireless network. The processing system is configured to select a visited internet connection for the wireless communication device and determine whether a lawful intercept is required. The processing system is further configured to include an intercept attribute in an authorization response indicating a destination for collecting intercepted information pursuant to the lawful intercept. The communication interface is configured to transfer the authorization response for delivery to the visited wireless network, wherein the visited wireless network provides the access to the internet in response to the authorization response and transfers the intercepted information for delivery to the destination.

20 Claims, 6 Drawing Sheets

U.S. PATENT DOCUMENTS

| | | |
|---|---|---|
| 2007/0297377 A1 | 12/2007 | McCann et al. |
| 2008/0031231 A1 | 2/2008 | Matias et al. |
| 2008/0039079 A1* | 2/2008 | Iyer et al. ............ 455/432.1 |
| 2008/0108322 A1 | 5/2008 | Upp |
| 2008/0144602 A1 | 6/2008 | Casey |
| 2008/0293417 A1 | 11/2008 | Zhang |
| 2008/0318556 A1* | 12/2008 | Erol et al. ............ 455/414.1 |
| 2009/0043891 A1 | 2/2009 | Woo et al. |
| 2009/0130984 A1* | 5/2009 | Lee ...................... 455/67.11 |
| 2009/0254650 A1 | 10/2009 | Sheppard |
| 2010/0135282 A1* | 6/2010 | Feng et al. ............ 370/352 |
| 2012/0147769 A1* | 6/2012 | Kalavade ............... 370/252 |

OTHER PUBLICATIONS

Hewlett-Packard Company, "HP-UX AAA Server A.06.00 Administration and Authentication Guide," HP-UX 11.0, 11i v1, 2003, pp. i-341, Hewlett-Packard Company, U.S.A., http://docs.hp.com/en/T1428-90025/T1428-90025.pdf.

Juniper Networks, Inc., "WiMAX Vendro Specific Attribute (VSA) Format," 1999, 3 pages, Juniper Networks, Inc., http://www.juniper.net/techpubs/software/aaa_802/sbrc/sbrc70/sw-sbrc-admin/html/WiMAX_Overview6.html.

Sergey Poznyakoff, "How Radius Operates," Nov. 20, 2004, 10 pages, Spivak.kiev.ua, http://www.spivak.kiev.ua/radius/radius_3.html.

* cited by examiner

LAWFUL INTERCEPT MANAGEMENT BY AN AUTHORIZATION SYSTEM

TECHNICAL BACKGROUND

Wireless communication networks typically include wireless communication devices which, via a wireless access node, communicate with further communication networks and equipment. Recently, a growing demand for mobile high speed data transfers has resulted in the development of several internet protocol (IP) mobility protocols. These IP mobility solutions attempt to solve the problem of a wireless communication device roaming within a network by providing location-independent routing of data packets.

Simple IP is an example of one such IP mobility solution. Under the simple IP protocol, a wireless communication device receives a dynamic IP from a local access router in a visited wireless network, and the visited wireless network provides a direct routing service for the wireless communication device. In the simple IP protocol, a wireless communication device must obtain a new IP address (and lose existing connections) every time it changes its point of attachment. Thus, when the wireless communication device moves from a coverage area of one access router to another, a change in the packet data session occurs when a new IP address is assigned by the new access router.

Many users are increasingly utilizing wireless communication networks for voice communications and data services. However, some of these users may be targets of law enforcement agencies, such as criminals, terrorists, or other users under investigation. Communication service providers are required by law to provide lawful interception services such as wiretapping, trace routes, signaling data, network management information, or the actual data sent and received by target users of law enforcement. These service providers must comply with lawful interception regulations, even when the target user is not connected to the internet through the service provider's network, which can occur when the target is utilizing a simple IP connection. In the United State, the Communications Assistance for Law Enforcement Act (CALEA) governs the manner in which communication service providers must conduct lawful interception. CALEA stipulates that lawful interception systems must be designed to hide the interception from a target user so that the user cannot detect that a third party is monitoring the user's communications.

Overview

A method of operating an authorization system in a home wireless network is disclosed, wherein a wireless communication device associated with the home wireless network transfers a request to a visited wireless network for access to an internet. The method comprises receiving an authorization request for the wireless communication device transmitted from the visited wireless network. The method further comprises, in response to the authorization request, selecting a visited internet connection for the wireless communication device, wherein the visited internet connection links the wireless communication device to the internet without using the home wireless network, and determining whether a lawful intercept is required based on information in the authorization request associated with the wireless communication device. The method further comprises, if the lawful intercept is required, including an intercept attribute in an authorization response, wherein the intercept attribute indicates a destination for collecting intercepted information pursuant to the lawful intercept. The method further comprises transferring the authorization response for delivery to the visited wireless network, wherein the visited wireless network provides the access to the internet in response to the authorization response and transfers the intercepted information for delivery to the destination.

An authorization system in a home wireless network comprises a communication interface and a processing system, wherein a wireless communication device associated with the home wireless network transfers a request to a visited wireless network for access to an internet. The communication interface is configured to receive an authorization request for the wireless communication device transmitted from the visited wireless network. The processing system is configured to, in response to the authorization request, select a visited internet connection for the wireless communication device, wherein the visited internet connection links the wireless communication device to the internet without using the home wireless network, and determine whether a lawful intercept is required based on information in the authorization request associated with the wireless communication device. The processing system is further configured to, if the lawful intercept is required, include an intercept attribute in an authorization response, wherein the intercept attribute indicates a destination for collecting intercepted information pursuant to the lawful intercept. The communication interface is configured to transfer the authorization response for delivery to the visited wireless network, wherein the visited wireless network provides the access to the internet in response to the authorization response and transfers the intercepted information for delivery to the destination.

A method of operating an authorization system in a home wireless network is disclosed, wherein a wireless communication device associated with the home wireless network transfers a request to a visited wireless network for access to an internet. The method comprises receiving an authorization request for the wireless communication device transmitted from the visited wireless network. The method further comprises, in response to the authorization request, selecting a visited internet connection for the wireless communication device, wherein the visited internet connection links the wireless communication device to the internet without using the home wireless network. The method further comprises transferring the authorization response for delivery to the visited wireless network, wherein the visited wireless network provides the access to the internet using the visited internet connection in response to the authorization response. The method further comprises determining that a lawful intercept is required for the wireless communication device during the access to the internet using the visited internet connection. The method further comprises, in response to determining that the lawful intercept is required, including an intercept attribute in an authorization modification request for the wireless communication device, wherein the intercept attribute indicates a destination for collecting intercepted information pursuant to the lawful intercept. The method further comprises transferring the authorization modification request for delivery to the visited wireless network, wherein the visited wireless network transfers the intercepted information for delivery to the destination.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
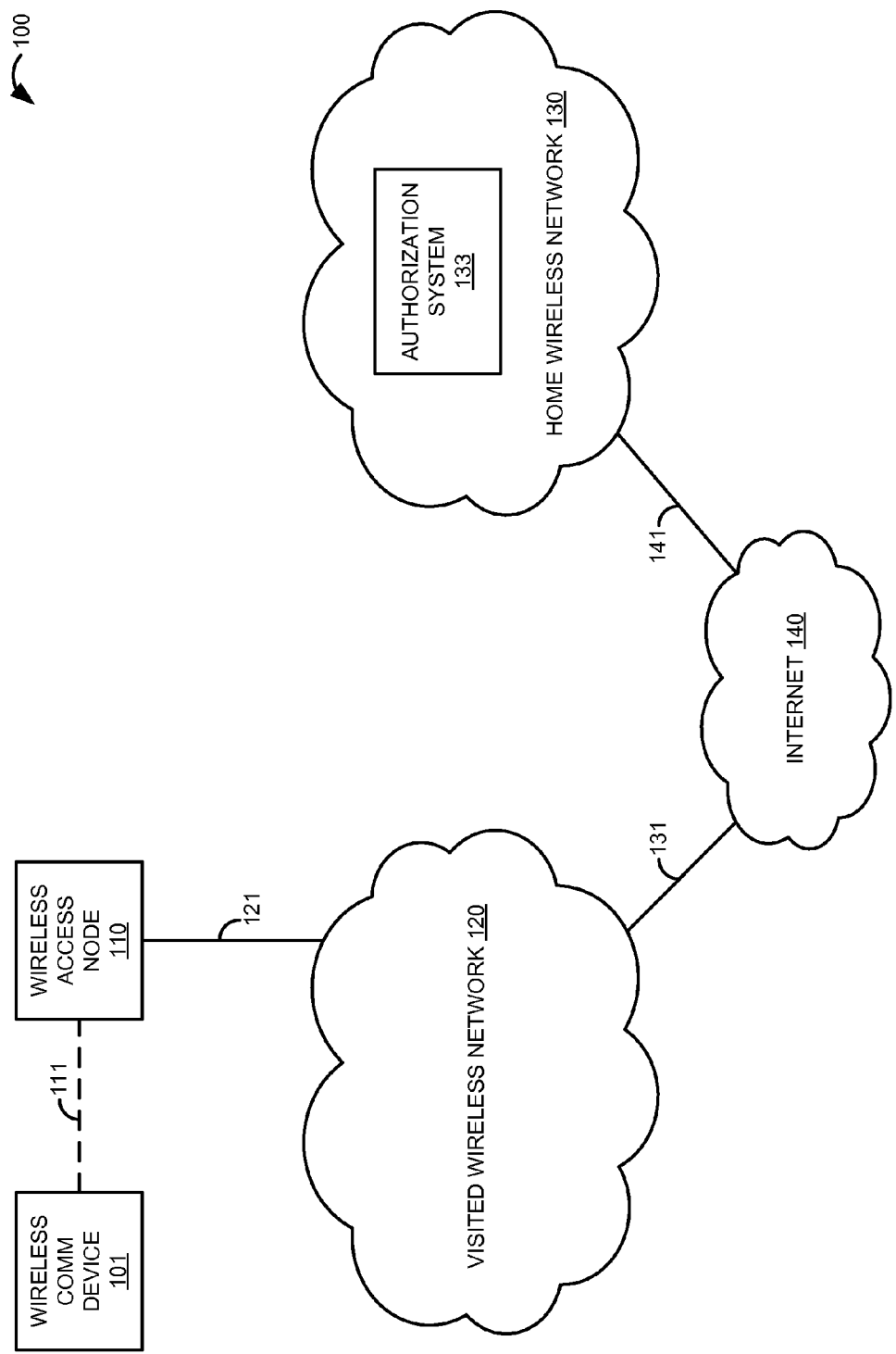
FIG. 1 is a block diagram that illustrates a communication system.

FIG. 1 is a block diagram that illustrates communication system 100. Communication system 100 includes wireless communication device 101, wireless access node 110, visited wireless network 120, home wireless network 130, and internet communication network 140. Home wireless network 130 includes authorization system 133. Wireless communication device 101 communicates with wireless access node 110 over wireless communication link 111. Wireless access node 110 is in communication with visited wireless network 120 over communication link 121. Visited wireless network 120 communicates with internet communication network 140 over communication link 131. Home wireless network 130 communicates with internet communication network 140 over communication link 141. Thus, visited wireless network 120 is in communication with home wireless network 130 over communication links 131, 141, and internet communication network 140.

Figure 2:
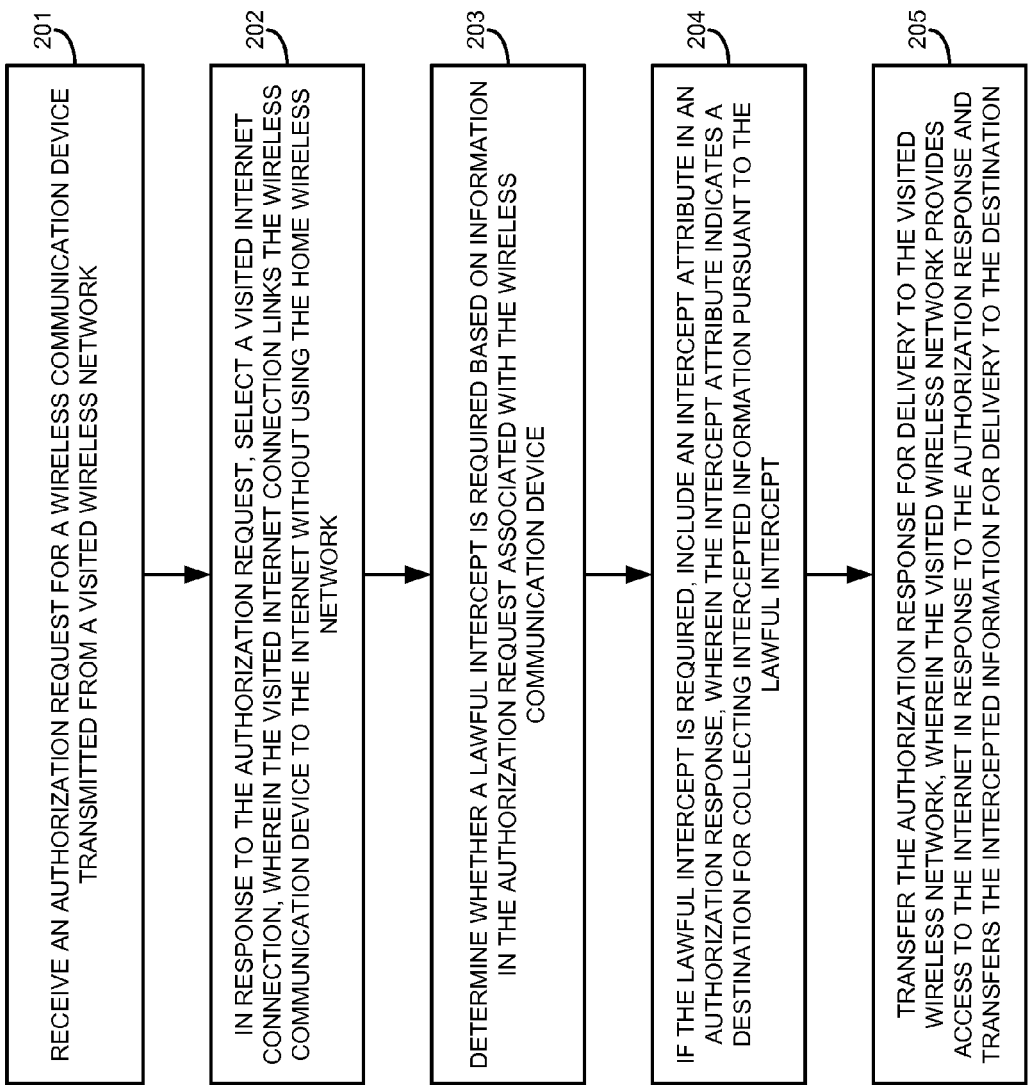
FIG. 2 is a flow diagram that illustrates an operation of the communication system.

FIG. 2 is a flow diagram that illustrates an operation of communication system 100. In particular, the operation shown in FIG. 2 depicts a method of operating authorization system 133 in home wireless network 130, wherein wireless communication device 101 is associated with home wireless network 130 and transfers a request to visited wireless network 120 for access to internet communication network 140.

In FIG. 2, authorization system 133 receives an authorization request for wireless communication device 101 transmitted from visited wireless network 120 (201). Typically, visited wireless network 120 will transmit the authorization request for delivery to home wireless network 130 in response to receiving the request from wireless communication device 101 for access to internet communication network 140. The request from wireless communication device 101 typically comprises user credentials and a unique identifier that identifies device 101 or its user to wireless networks 120 and 130. Typically, the authorization request received by authorization system 133 instructs authorization system 133 to authenticate and authorize wireless communication device 101 to access internet communication network 140 via visited wireless network 120. The authorization request could comprise any message in any protocol, but in some examples, authorization system 133 receives the authorization request in a remote authentication dial in user service (RADIUS) request message, such as an Access-Request message in the RADIUS networking protocol. In other examples, authorization system 133 receives the authorization request in a diameter request message, such as an AA-Request or a Diameter-EAP-Request in the diameter networking protocol.

In response to the authorization request, authorization system 133 selects a visited internet connection for wireless communication device 101 (202). The visited internet connection results in linking wireless communication device 101 to internet communication network 140 without using home wireless network 130 (202). In some examples, the visited internet connection links wireless communication device 101 to internet communication network 140 without using the home wireless network 130 by utilizing a simple IP protocol. Authorization system 133 may select a visited internet connection for wireless communication device 101 based on any criteria, such as a realm of wireless communication device 101, a user request included in the authorization request, an application executing on device 101 indicated in the authorization request, a user profile that indicates an Internet access user, or based on default values, for example.

Authorization system 133 determines whether a lawful intercept is required for wireless communication device 101 based on information in the authorization request associated with wireless communication device 101 (203). The information in the authorization request associated with wireless communication device 101 could comprise the user credentials and/or the unique identifier that identifies device 101 or its user as discussed above. For example, the unique identifier could comprise a packet address, Mobile Station International Subscriber Directory Number (MSISDN) or some other telephone number, Electronic Serial Number (ESN), Mobile Station Identifier (MSID), Mobile Equipment Identifier (MEID), International Mobile Equipment Identity (IMEI), International Mobile Subscriber Identity (IMSI), or some other identifier that uniquely identifies wireless communication device 101 and/or a user of device 101.

To determine whether the lawful intercept is required for wireless communication device 101, authorization system 133 typically accesses a database comprising a list of target users who require lawful interception and compares the information in the authorization request associated with wireless communication device 101 to the list of target users, for example. In other examples, the list could be stored in a memory device of authorization system 133, and could comprise any identifying information associated with the target users, such as device identifiers, packet addresses, email addresses, or usernames that the target users are known to utilize. Typically, a target user for lawful interception is specified by the IMEI, IMSI, and MSISDN. Thus, in some examples, authorization system 133 determines whether a lawful intercept is required for wireless communication device 101 based on an IMEI, IMSI, and MSISDN in the authorization request associated with wireless communication device 101.

If authorization system 133 determines that the lawful intercept is required, authorization system 133 includes an intercept attribute in an authorization response (204). The intercept attribute indicates a destination for collecting intercepted information pursuant to the lawful intercept (204). The destination could comprise any location suitable for collecting the intercepted information, such as a lawful interception system operated by a communication service provider or a law enforcement agency requesting the lawful intercept. In some examples, the destination for collecting the intercepted information pursuant to the lawful intercept comprises a packet address of a tunnel endpoint for a proxy mobile IP tunnel.

Authorization system 133 transfers the authorization response for delivery to visited wireless network 120 (205).

The authorization response typically indicates the visited internet connection for wireless communication device 101 as selected by authorization system 133. The authorization response could comprise any message to visited wireless network 120 in any protocol, but in some examples, authorization system 133 transfers the authorization response for delivery to visited wireless network 120 in a RADIUS response message, such as an Access-Accept message in the RADIUS networking protocol. In other examples, authorization system 133 transfers the authorization response for delivery to visited wireless network 120 in a diameter response message, such as an AA-Answer or a Diameter-EAP-Answer in the diameter networking protocol. In response to the authorization response, visited wireless network 120 provides wireless communication device 101 access to internet communication network 140 (205). Thus, visited wireless network 120 links communication device 101 to internet communication network 140 without using home wireless network 130. In some examples, visited wireless network 120 links wireless communication device 101 to internet communication network 140 directly over communication link 131.

Once the access to internet communication network 140 is established, visited wireless network 120 transfers the intercepted information for delivery to the destination (205). Typically, visited wireless network 120 must not allow a user of wireless communication device 101 to detect that the intercepted information has been intercepted and transferred to the destination. Thus, in some examples, visited wireless network 120 transfers the intercepted information for delivery to the destination by port mirroring the intercepted information to a packet address of a tunnel endpoint for a proxy mobile IP tunnel.

Advantageously, when authorization system 133 of home wireless network 130 selects a visited internet connection for wireless communication device 101 when device 101 is roaming in visited wireless network 120, authorization system 133 may determine that a lawful intercept is required for device 101 and inform visited wireless network 120 of the lawful intercept requirement in the authorization response. Visited wireless network 120 may then covertly intercept information pursuant to the lawful intercept and transfer the intercepted information to a destination specified in the authorization response. In this manner, a communication service provider associated with home wireless network 130 can ensure compliance with lawful interception regulations, even when wireless communication device 101 is utilizing the visited internet connection for access to internet communication network 140.

Referring back to FIG. 1, wireless communication device 101 may comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNode B), and others. Wireless network protocols that may be utilized by wireless access node 110 include CDMA, GSM, UMTS, HSPA, EV-DO, EV-DO rev. A, 3GPP LTE, WiMAX, Wi-Fi, Bluetooth, Internet, telephony, or some other communication format—including combinations thereof.

Visited wireless network 120 comprises the core network of a wireless communication provider, and could include routers, gateways, telecommunication switches, servers, processing systems, or other communication equipment and systems for providing communication and data services. Likewise, home wireless network 130 comprises the core network of a wireless communication provider, and could include routers, gateways, telecommunication switches, servers, processing systems, or other communication equipment and systems for providing communication and data services. Wireless networks 120 and 130 could comprise wireless communication nodes, telephony switches, Internet routers, network gateways, computer systems, communication links, or some other type of communication equipment—including combinations thereof. Wireless networks 120 and 130 may also comprise optical networks, asynchronous transfer mode (ATM) networks, packet networks, metropolitan-area networks (MAN), or other network topologies, equipment, or systems—including combinations thereof. Wireless networks 120 and 130 may be configured to communicate over metallic, wireless, or optical links. Wireless networks 120 and 130 may be configured to use time-division multiplexing (TDM), Internet Protocol (IP), Ethernet, optical networking, wireless protocols, communication signaling, or some other communication format—including combinations thereof. In some examples, wireless networks 120 and 130 include further access nodes and associated equipment for providing communication services to many wireless communication devices across a large geographic region.

Authorization system 133 comprises a computer system and communication interface. Authorization system 133 may also include other components such a router, server, data storage system, and power supply. Authorization system 133 may reside in a single device or may be distributed across multiple devices. Authorization system 133 may be a discrete system or may be integrated within other systems—including other systems within home wireless network 130. Authorization system 133 could comprise an authentication, authorization, and accounting (AAA) server, packet gateway, mobile switching center, network gateway system, Internet access node, application server, service node, firewall, or some other communication system—including combinations thereof. Authorization system 133 is in communication with internet communication network 140 over communication link 141.

Internet communication network 140 comprises multiple network elements such as routers, gateways, telecommunication switches, servers, processing systems, or other communication equipment and systems for providing communication and data services. Internet communication network 140 could comprise wireless communication nodes, telephony switches, Internet routers, network gateways, computer systems, communication links, or some other type of communication equipment—including combinations thereof. Internet communication network 140 may also comprise optical networks, ATM networks, packet networks, wide area networks (WAN), MAN, or other network topologies, equipment, or systems—including combinations thereof. Internet communication network 140 may be configured to communicate over metallic, wireless, or optical links. Internet communication network 140 may be configured to use TDM, IP, Ethernet, optical networking, wireless protocols, communication signaling, or some other communication format—including combinations thereof. In some examples, internet communication network 140 includes further access nodes and associated equipment for providing communication services across a large geographic region.

Wireless communication link 111 uses the air or space as the transport medium. Wireless communication link 111 may use various protocols, such as CDMA, GSM, UMTS, HSPA, EV-DO, EV-DO rev. A, 3GPP LTE, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication links 121, 131, and 141 use metal, air, space, optical fiber such as glass or plastic, or some other material as the transport media—including combinations thereof. Communication links 121, 131, and 141 could use various communication protocols, such as TDM, IP, Ethernet, telephony, optical networking, hybrid fiber coax (HFC), communication signaling, wireless protocols, or some other communication format—including combinations thereof. Communication links 121, 131, and 141 may be direct links or could include intermediate networks, systems, or devices.

Figure 3:
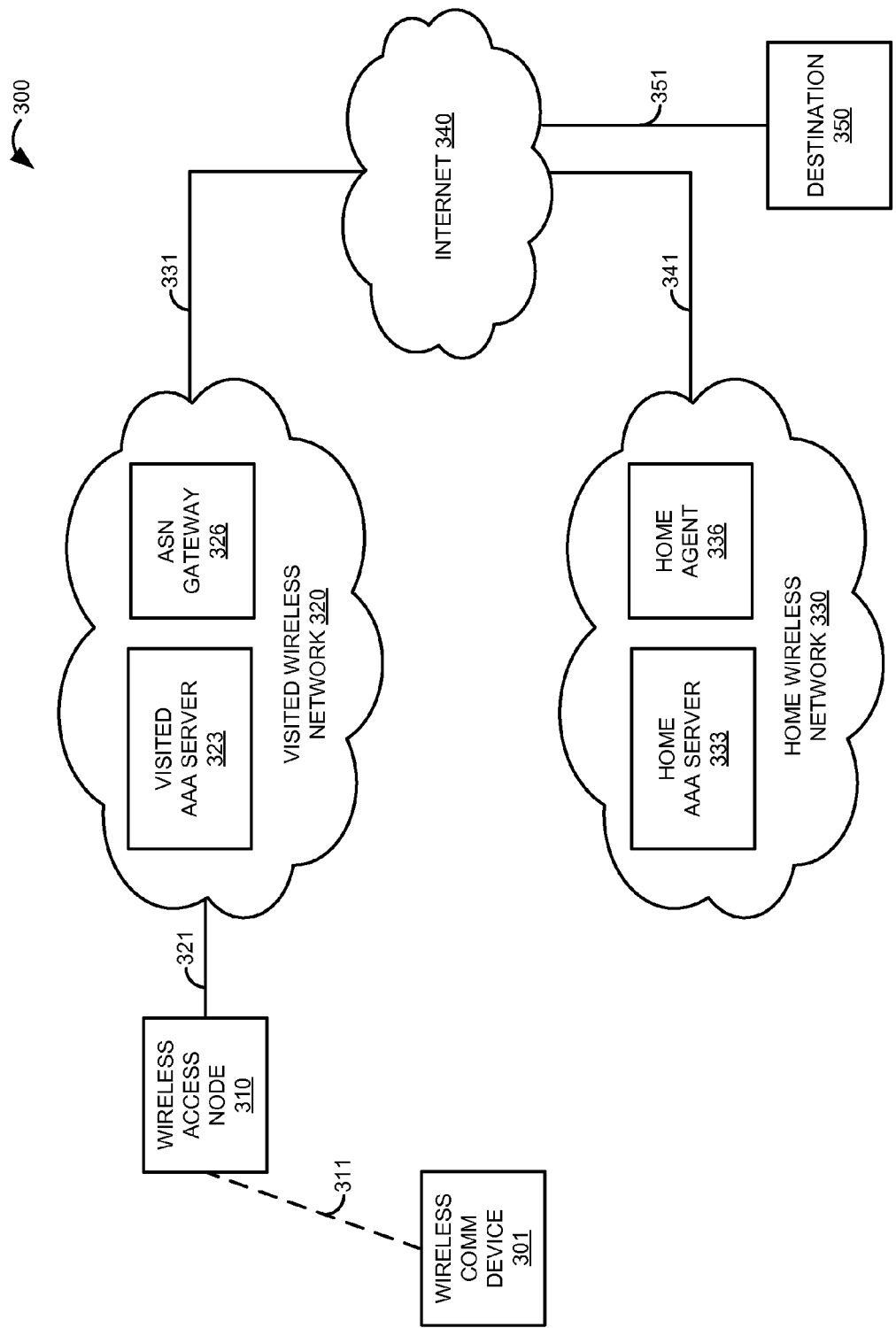
FIG. 3 is a block diagram that illustrates a communication system in an exemplary embodiment.

FIG. 3 is a block diagram that illustrates communication system 300 in an exemplary embodiment. Communication system 300 includes wireless communication device 301, wireless access node 310, visited wireless network 320, home wireless network 330, internet 340, and destination 350. Visited wireless network 320 includes visited AAA server 323 and access service network (ASN) gateway 326. Home wireless network 330 includes home AAA server 333 and home agent 336. Wireless communication device 301 in is communication with wireless access node 310 over wireless communication link 311. Wireless access node 310 communicates with visited wireless network 320 over communication link 321. Visited wireless network 320 and home wireless network 330 are in communication with each other over internet 340 via respective communication links 331 and 341. Destination 350 communicates with internet 340 over communication link 351. In the exemplary embodiment of FIG. 3, visited wireless network 320 and home wireless network 330 comprise WiMAX wireless networks.

Figure 4:
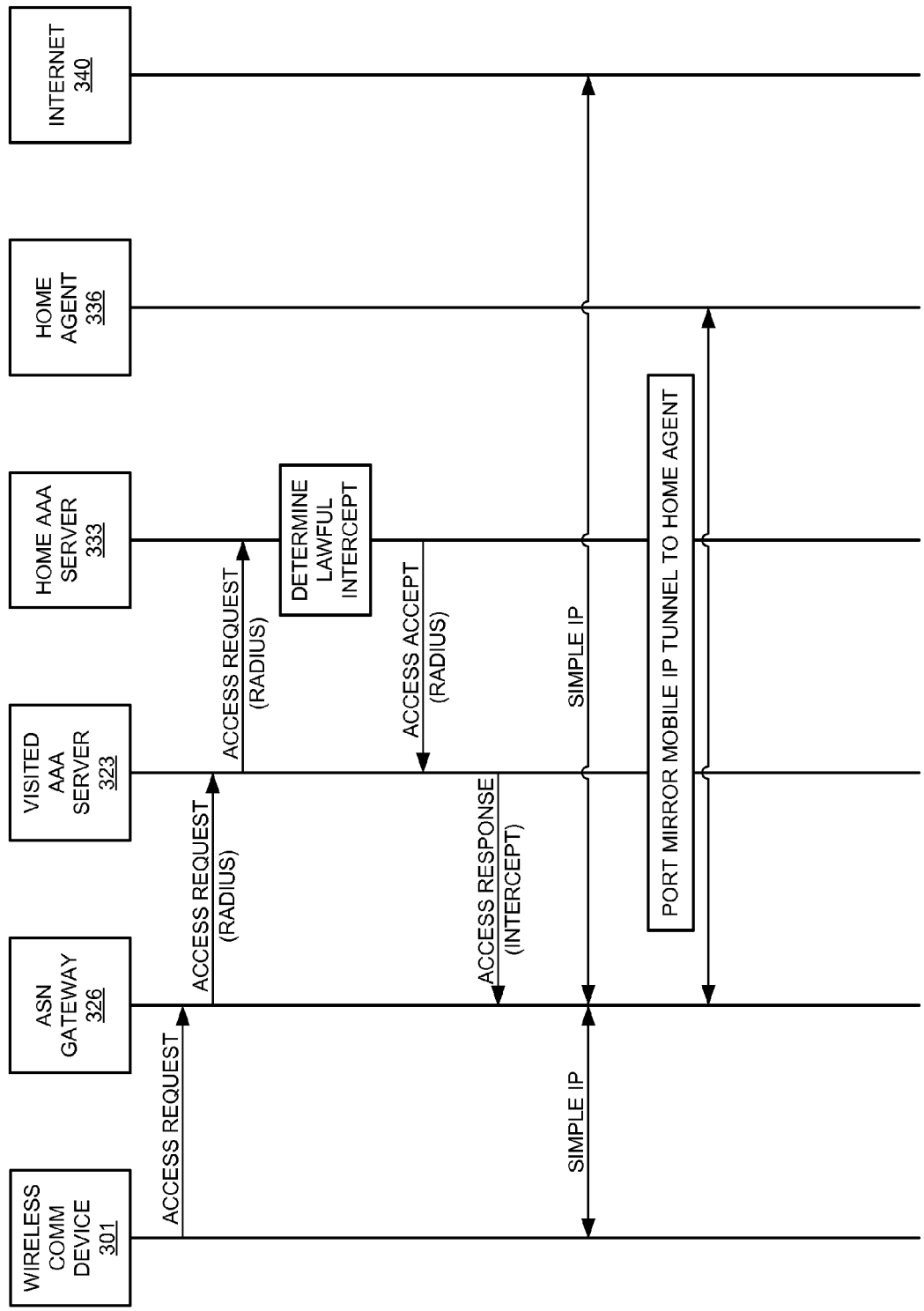
FIG. 4 is a sequence diagram that illustrates an operation of the communication system in an exemplary embodiment.

FIG. 4 is a sequence diagram that illustrates an operation of communication system 300 in an exemplary embodiment. The sequence diagram of FIG. 4 depicts a scenario in which wireless communication device 301 has an associated home agent 336 in home wireless network 330 and device 301 is roaming within visited wireless network 320. In order to gain access to internet 340, wireless communication device 301 transfers an access request to ASN gateway 326 requesting access to internet 340.

ASN gateway 326 receives the access request from wireless communication device 301. The access request typically includes access credentials in the form of a username and password or security certificate provided by the user of wireless communication device 301. In addition, the access request may contain the user's realm either prefixed and/or appended to the username. Upon receipt of the access request from wireless communication device 301, ASN gateway 326 forwards the access request to visited AAA server 323 in a RADIUS Access-Request message.

The realm included in the username of the RADIUS Access-Request message identifies where visited AAA server 323 should forward the RADIUS Access-Request message for processing. Thus, based on the realm for the username indicated in the Access-Request, visited AAA server 323 proxies the Access-Request to the home AAA server 333 for that realm.

Upon receipt of the proxied RADIUS Access-Request message from visited AAA server 323, home AAA server 333 processes the user credentials and other information contained in the Access-Request message to authenticate the user of wireless communication device 301 and authorize the user for access to internet 340. To process the user credentials, home AAA server 333 typically accesses a database comprising authentic user credentials to verify the credentials provided by the user of wireless communication device 301 in the RADIUS Access-Request message. Upon successful authentication of the user, home AAA server 333 formulates a RADIUS Access-Accept message.

In formulating the RADIUS Access-Accept message, home AAA server 333 typically selects a simple IP mobility protocol for wireless communication device 301, such as simple IPv4 or simple IPv6, for example. However, note that home AAA server 333 may not select a simple IP mobility protocol for wireless communication device 301 in some examples, such as when visited wireless network 320 always uses a simple IP protocol. In addition, home AAA server 333 determines whether a lawful intercept is required for wireless communication device 301 based on the user credentials and other identifying information contained in the RADIUS Access-Request message. To determine whether the lawful intercept is required, home AAA server 333 typically accesses a database comprising a list of predetermined users who require lawful interception and compares the identifying information in the Access-Request to the list of predetermined users. In this example, home AAA server 333 determines that a lawful intercept is required for wireless communication device 301 by matching the IMEI, IMSI, MSISDN, home provider realm, and media access control identifier (MAC-ID) in the Access-Request with a database record identifying device 301 by the same IMEI, IMSI, MSISDN, home provider realm, and MAC-ID as a target for lawful interception.

Once home AAA server 333 determines that the lawful intercept is required for wireless communication device 301, home AAA server 333 includes an intercept attribute in a RADIUS Access-Accept message. The intercept attribute indicates a destination for collecting intercepted information pursuant to the lawful intercept. In the exemplary embodiment of FIG. 4, the destination for collecting the intercepted information pursuant to the lawful intercept comprises the home agent 336 of device 301. Thus, home agent 336 is specified in the intercept attribute by a packet address of home agent 336 designating a tunnel endpoint for a proxy mobile IP tunnel to home agent 336. Home AAA server 333 then transfers the RADIUS Access-Accept message comprising the intercept attribute for delivery to visited AAA server 323.

Visited AAA server 323 receives the RADIUS Access-Accept message transmitted from home AAA server 333. Visited AAA server 323 processes the Access-Accept message to determine the included intercept attribute for wireless communication device 301 and whether the home AAA server 333 included a simple IP mobility protocol selection for device 301. Based on this information, visited AAA server 323 formulates an access response message for the ASN gateway 326 which includes the intercept attribute. Visited AAA server 323 then transfers the access response message comprising the intercept attribute to ASN gateway 326. In examples where a simple IP mobility protocol is included by home AAA server 333 in the Access-Accept message, visited AAA server 323 may also include the simple IP mobility protocol selection in the access response message transferred to ASN gateway 326.

ASN gateway 326 receives the access response message from visited AAA server 323 and processes the access response to determine whether wireless communication device 301 is authorized to access internet 340. In response to determining that wireless communication device 301 is authorized, ASN gateway 326 connects device 301 directly to internet 340. In some examples, ASN gateway 326 connects device 301 to internet 340 in the simple IP protocol based on a simple IP mobility protocol that may have been selected by home AAA server 333. ASN gateway 326 thereby provides a direct and efficient connection between wireless communication device 301 and internet 340, especially when visited wireless network 320 and home wireless network 330 are separated by a great distance.

ASN gateway 326 is also configured to recognize the intercept attribute in the access response. Thus, once the simple IP connection between wireless communication device 301 and internet 340 is established, ASN gateway 326 processes the intercept attribute to determine the specified destination of the lawful intercept. In this example, the destination in the access response indicates the home agent 336 of wireless communication device 301. ASN gateway 326 therefore creates a secure proxy mobile IP tunnel to home agent 336 and port minors the traffic between device 301 and internet 340 to the tunnel endpoint. In this manner, the communication service provider of wireless communication device 301 can securely store and retrieve the intercepted information from home agent 336 and deliver the data to law enforcement in compliance with lawful interception regulations.

Figure 5:
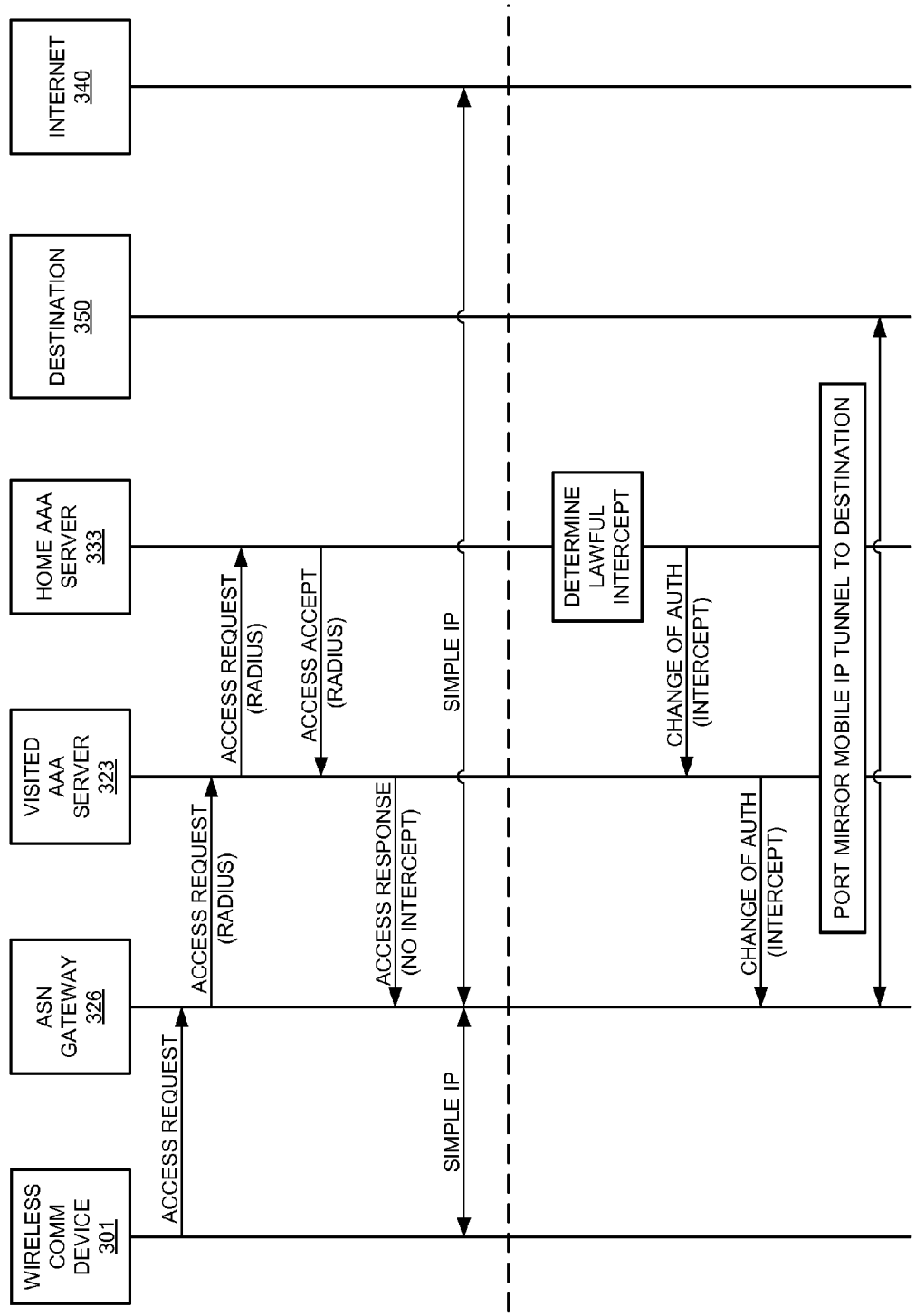
FIG. 5 is a sequence diagram that illustrates an operation of the communication system in an exemplary embodiment.

FIG. 5 is a sequence diagram that illustrates an operation of communication system 300 in an exemplary embodiment. In FIG. 5, wireless communication device 301 transfers an access request to ASN gateway 326 requesting access to internet 340, and in response, ASN gateway 326 transfers an Access-Request message to visited AAA server 323 in a RADIUS protocol. AAA server 323 forwards the Access-Request message for delivery to home AAA server 333.

Upon receipt of the Access-Request message, home AAA server 333 determines whether wireless communication device 301 is authorized to access internet 340. If home AAA server 333 determines that device 301 is authorized, home AAA server 333 transfers an Access-Accept message in the RADIUS protocol for delivery to visited AAA server 323. However, unlike the scenario of FIG. 4, home AAA server 333 does not include an intercept attribute in the Access-Accept message because the communication service provider of home wireless network 330 has not yet received a lawful interception requirement for device 301 from a law enforcement agency. In response to receiving the Access-Accept message, visited AAA server 323 transfers an access response to ASN gateway 326. In response to the access response indicating authorization for wireless communication device 301 to access internet 340, ASN gateway 326 connects wireless communication device 301 directly to internet 340. In some examples, ASN gateway 326 may connect wireless communication device 301 to internet 340 in a simple IP protocol.

At a later point in time (as shown by the dashed line in FIG. 5), home AAA server 333 determines that a lawful intercept is now required for wireless communication device 301. This may occur, for example, if a law enforcement agency provides instructions to tap the communications of wireless communication device 301 while device 301 is already connected to internet 340 via ASN gateway 340 using the simple IP connection. In order to comply with the requirement that the user of device 301 must not detect the interception, executing the lawful intercept cannot interfere with the existing simple IP connection to internet 340 provided by ASN gateway 326. Therefore, home AAA server 333 transfers a RADIUS Change-of-Authorization request to visited AAA server 323 in response to determining that a lawful intercept for wireless communication device 301 is now required. The Change-of-Authorization request comprises an intercept attribute indicating the new requirement for lawful interception of the communications of wireless communication device 301.

Visited AAA server 323 receives the Change-of-Authorization transmitted from home AAA server 333 and forwards the Change-of-Authorization which includes the intercept attribute to ASN gateway 326. ASN gateway 326 receives the Change-of-Authorization message and is configured to recognize the intercept attribute. Thus, ASN gateway 326 processes the intercept attribute to determine the specified destination of the lawful intercept. In this example, the destination in the access response indicates destination 350. Destination 350 comprises a tunnel endpoint at a third party aggregator or exchange network that the operator of home wireless network 330 can securely access to retrieve the intercepted information for delivery of the data to law enforcement. ASN gateway 326 therefore creates a secure proxy mobile IP tunnel to destination 350 and port minors the traffic between device 301 and internet 340 to the tunnel endpoint. Notably, ASN gateway 326 continues to allocate an IP address out of the common pool that was previously assigned to device 301 before the intercept, and applies the same routing tables as defined by a trace route to prevent the user of device 301 from detecting the interception. In this manner, the communication service provider of wireless communication device 301 can comply with lawful interception regulations by ensuring the user of device 301 is unaware of the tap while still enabling the secure retrieval of the intercepted information from destination 350 for delivery to law enforcement.

Figure 6:
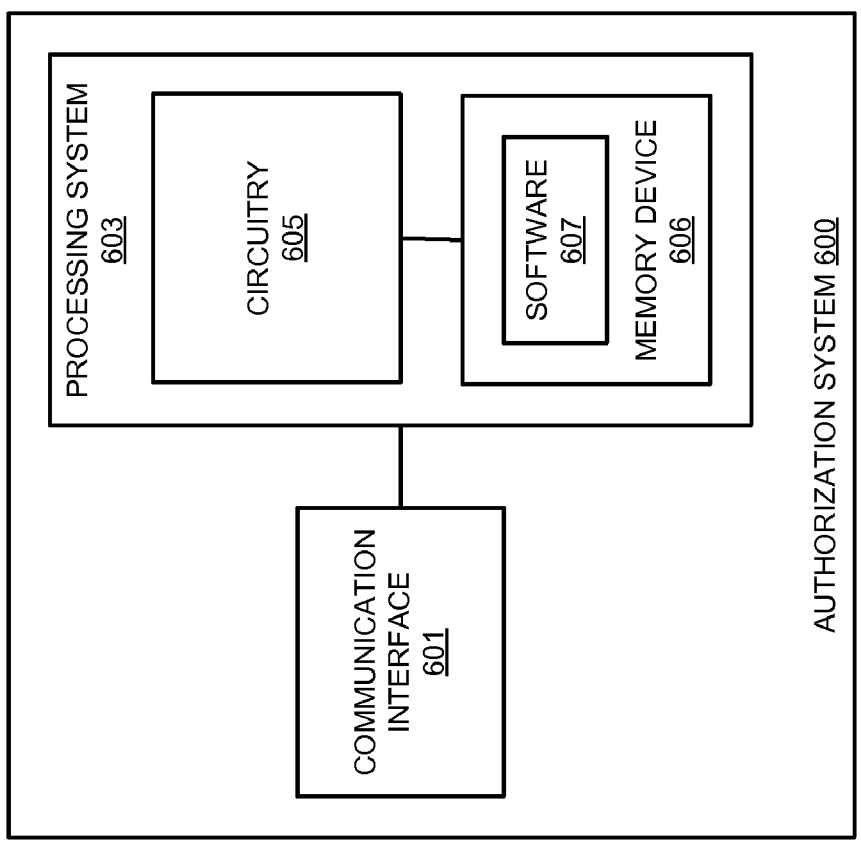
FIG. 6 is a block diagram that illustrates an authorization system.

FIG. 6 is a block diagram that illustrates authorization system 600. Authorization system 600 provides an example of authorization system 133, although system 133 may use alternative configurations. Authorization system 600 comprises communication interface 601 and processing system 603. Processing system 603 is linked to communication interface 601. Processing system 603 includes processing circuitry 605 and memory device 606 that stores operating software 607.

Communication interface 601 comprises components that communicate over communication links, such as network cards, ports, RF transceivers, processing circuitry and software, or some other communication components. Communication interface 601 may be configured to communicate over metallic, wireless, or optical links. Communication interface 601 may be configured to use TDM, IP, Ethernet, optical networking, wireless protocols, communication signaling, or some other communication format—including combinations thereof. Communication interface 601 is configured to receive an authorization request for a wireless communication device transmitted from a visited wireless network and configured to transfer an authorization response for delivery to the visited wireless network, wherein the authorization response comprises an intercept attribute and a visited internet connection selected for the wireless communication device. In some examples, communication interface 601 may also be configured to transfer an authorization modification request comprising an intercept attribute for delivery to the visited wireless network.

Processing circuitry 605 comprises microprocessor and other circuitry that retrieves and executes operating software 607 from memory device 606. Memory device 606 comprises a disk drive, flash drive, data storage circuitry, or some other memory apparatus. Operating software 607 comprises computer programs, firmware, or some other form of machine-readable processing instructions. Operating software 607 may include an operating system, utilities, drivers, network interfaces, applications, or some other type of software. When executed by circuitry 605, operating software 607 directs processing system 603 to operate as described herein for authorization system 133. In particular, operating software 607 directs processing system 603 to select a visited internet connection for a wireless communication device in response to an authorization request. Further, operating software 607 directs processing system 603 to determine whether a lawful intercept is required based on information in the authorization request associated with the wireless communication device. If the lawful intercept is required, operating software 607 directs processing system 603 to include an intercept attribute in an authorization response, wherein the intercept attribute indicates a destination for collecting intercepted information pursuant to the lawful intercept. In addition, operating software 607 may direct processing system 603 to direct communication interface 601 to transfer an authorization response for delivery to a visited wireless network.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating an authorization system in a home wireless network, wherein a wireless communication device associated with the home wireless network transfers a request to a visited wireless network for access to an internet, the method comprising:
receiving an authorization request for the wireless communication device transmitted from the visited wireless network;
in response to the authorization request, selecting a visited internet connection for the wireless communication device, wherein the visited internet connection links the wireless communication device to the internet without using the home wireless network, and determining whether a lawful intercept is required based on information in the authorization request associated with the wireless communication device;
if the lawful intercept is required, including an intercept attribute in an authorization response, wherein the intercept attribute indicates a destination for collecting intercepted information pursuant to the lawful intercept; and
transferring the authorization response for delivery to the visited wireless network, wherein the visited wireless network provides the access to the internet in response to the authorization response and transfers the intercepted information for delivery to the destination.

2. The method of claim 1 wherein receiving the authorization request for the wireless communication device comprises receiving a remote authentication dial in user service (RADIUS) request message and wherein transferring the authorization response for delivery to the visited wireless network comprises transferring a RADIUS response message.

3. The method of claim 1 wherein receiving the authorization request for the wireless communication device comprises receiving a diameter request message and wherein transferring the authorization response for delivery to the visited wireless network comprises transferring a diameter response message.

4. The method of claim 1 wherein the destination for collecting the intercepted information pursuant to the lawful intercept comprises a packet address of a tunnel endpoint for a proxy mobile internet protocol (proxy mobile IP) tunnel.

5. The method of claim 4 wherein the visited wireless network transfers the intercepted information for delivery to the destination by port mirroring the intercepted information to the packet address of the tunnel endpoint for the proxy mobile IP tunnel.

6. The method of claim 1 wherein the visited internet connection links the wireless communication device to the internet without using the home wireless network by utilizing a simple internet protocol (simple IP) protocol.

7. The method of claim 1 wherein the authorization system comprises an authentication, authorization, and accounting server.

8. An authorization system in a home wireless network, wherein a wireless communication device associated with the home wireless network transfers a request to a visited wireless network for access to an internet, the authorization system comprising:
a communication interface configured to receive an authorization request for the wireless communication device transmitted from the visited wireless network;
a processing system configured to, in response to the authorization request, select a visited internet connection for the wireless communication device, wherein the visited internet connection links the wireless communication device to the internet without using the home wireless network, and determine whether a lawful intercept is required based on information in the authorization request associated with the wireless communication device;
the processing system further configured to, if the lawful intercept is required, include an intercept attribute in an authorization response, wherein the intercept attribute indicates a destination for collecting intercepted information pursuant to the lawful intercept; and the communication interface configured to transfer the authorization response for delivery to the visited wireless network, wherein the visited wireless network provides the access to the internet in response to the authorization response and transfers the intercepted information for delivery to the destination.

9. The system of claim 8 wherein the communication interface configured to receive the authorization request for the wireless communication device comprises the communication interface configured to receive a remote authentication dial in user service (RADIUS) request message and wherein the communication interface configured to transfer the authorization response for delivery to the visited wireless network comprises the communication interface configured to transfer a RADIUS response message.

10. The system of claim 8 wherein the communication interface configured to receive the authorization request for the wireless communication device comprises the communication interface configured to receive a diameter request message and wherein the communication interface configured to transfer the authorization response for delivery to the visited wireless network comprises the communication interface configured to transfer a diameter response message.

11. The system of claim 8 wherein the destination for collecting the intercepted information pursuant to the lawful intercept comprises a packet address of a tunnel endpoint for a proxy mobile internet protocol (proxy mobile IP) tunnel.

12. The system of claim 11 wherein the visited wireless network transfers the intercepted information for delivery to the destination by port minoring the intercepted information to the packet address of the tunnel endpoint for the proxy mobile IP tunnel.

13. The system of claim 8 wherein the visited internet connection links the wireless communication device to the internet without using the home wireless network by utilizing a simple internet protocol (simple IP) protocol.

14. The system of claim 8 further comprising:
the processing system further configured, if the lawful intercept is not required based on the information in the authorization request, to not include the intercept attribute in the authorization response;
the processing system further configured to determine that the lawful intercept is required for the wireless communication device during the access to the internet using the visited connection, and include the intercept attribute in an authorization modification request for the wireless communication device; and
the communication interface configured to transfer the authorization modification request to the visited wireless network, wherein the visited wireless network transfers the intercepted information for delivery to the destination based on the authorization modification request.

15. A method of operating an authorization system in a home wireless network, wherein a wireless communication device associated with the home wireless network transfers a request to a visited wireless network for access to an internet, the method comprising:

receiving an authorization request for the wireless communication device transmitted from the visited wireless network;

in response to the authorization request, selecting a visited internet connection for the wireless communication device, wherein the visited internet connection links the wireless communication device to the internet without using the home wireless network;

transferring an authorization response for delivery to the visited wireless network, wherein the visited wireless network provides the access to the internet using the visited internet connection in response to the authorization response;

determining that a lawful intercept is required for the wireless communication device during the access to the internet using the visited internet connection;

in response to determining that the lawful intercept is required, including an intercept attribute in an authorization modification request for the wireless communication device, wherein the intercept attribute indicates a destination for collecting intercepted information pursuant to the lawful intercept; and transferring the authorization modification request for delivery to the visited wireless network, wherein the visited wireless network transfers the intercepted information for delivery to the destination.

16. The method of claim 15 wherein receiving the authorization request for the wireless communication device comprises receiving a remote authentication dial in user service (RADIUS) request message, wherein transferring the authorization response for delivery to the visited wireless network comprises transferring a RADIUS response message, and wherein transferring the authorization modification request comprises transferring a RADIUS change of authorization request.

17. The method of claim 15 wherein receiving the authorization request for the wireless communication device comprises receiving a diameter request message, wherein transferring the authorization response for delivery to the visited wireless network comprises transferring a diameter response message, and wherein transferring the authorization modification request comprises transferring a diameter Re-Auth-Request.

18. The method of claim 15 wherein the destination for collecting the intercepted information pursuant to the lawful intercept comprises a packet address of a tunnel endpoint for a proxy mobile internet protocol (proxy mobile IP) tunnel.

19. The method of claim 18 wherein the visited wireless network transfers the intercepted information for delivery to the destination by port minoring the intercepted information to the packet address of the tunnel endpoint for the proxy mobile IP tunnel.

20. The method of claim 15 wherein the visited internet connection links the wireless communication device to the internet without using the home wireless network by utilizing a simple internet protocol (simple IP) protocol.

* * * * *